T. WRIGLEY.
Spinning Machinery.
No. 212,779. Patented Feb. 25, 1879.
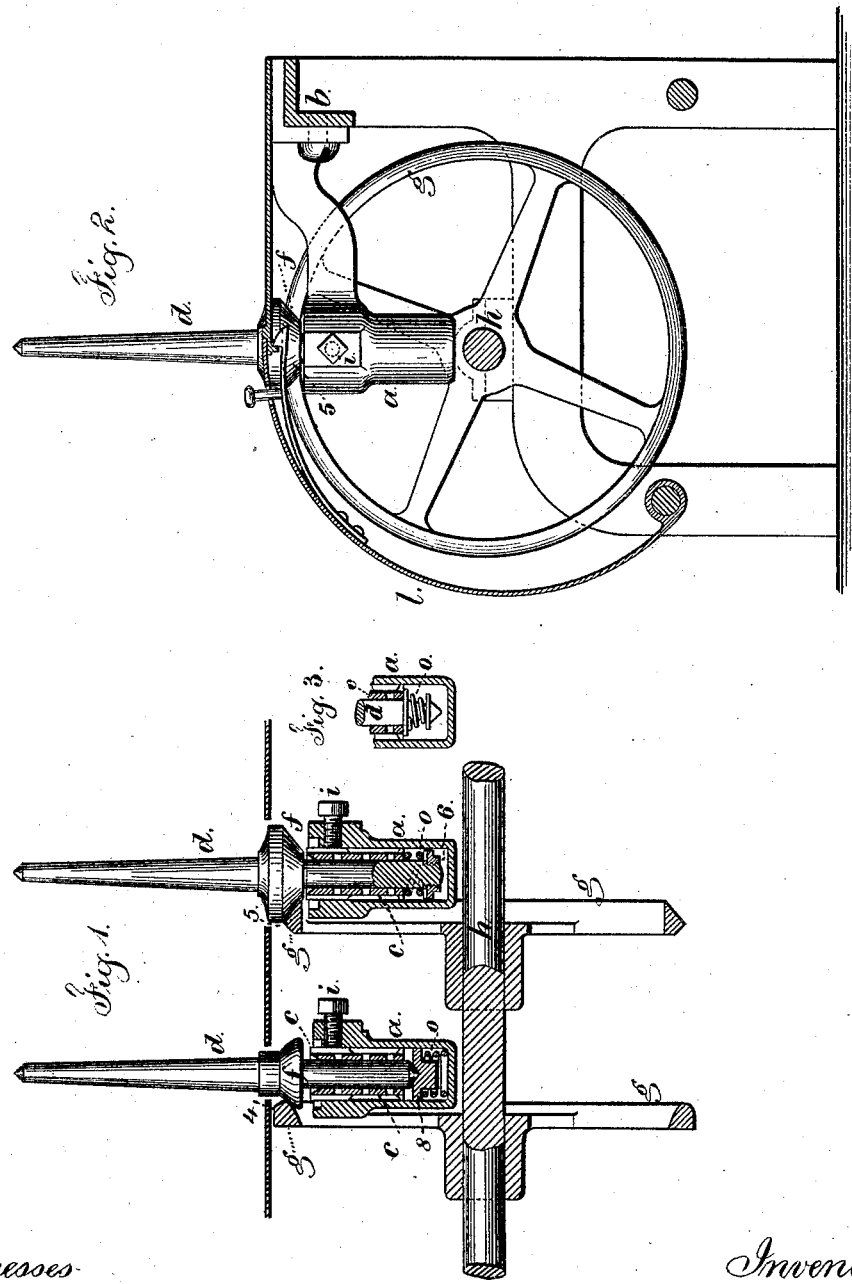

UNITED STATES PATENT OFFICE.

THOMAS WRIGLEY, OF PATERSON, NEW JERSEY.

IMPROVEMENT IN SPINNING MACHINERY.

Specification forming part of Letters Patent No. 212,779, dated February 25, 1879; application filed December 24, 1877.

*To all whom it may concern:*

Be it known that I, THOMAS WRIGLEY, of Paterson, in the county of Passaic and State of New Jersey, have invented an Improvement in Spinning Machinery, of which the following is a specification:

This invention is an improvement upon that for which Letters Patent No. 179,496 were granted to me July 4, 1876. I make use of a tubular socket closed at the bottom to retain the oil, and there is a cylindrical bearing or bushing surrounding the spindle and within the socket, and a spring, also within the socket, that gives end motion to the spindle, to keep the friction-pinion in contact with the surface of the driving-wheel.

In the drawings, Figure 1 is a vertical section of two of these spindles. Fig. 2 is a section, transversely, of the driving-shaft.

The socket $a$ is preferably of cast-iron, at the end of a rigid arm projecting from the rail or bar $b$. The upper end of this socket is made as a cup or lip for receiving or holding oil; and $c$ is a tubular bushing, through which the cylindrical journal portion of the spindle $d$ passes. This bushing fits into the socket $a$, and is held by a set-screw, $i$, and there are grooves upon the outside of the bushing, or upon the inside of the socket, forming oil-channels, so that the oil may run freely into the socket $a$ and fill the chamber left therein for such oil.

The spindle $d$ has upon it the pinion $f$ with a surface, preferably of leather, in contact with the wheel $g$, so as to be driven by the frictional contact therewith; and each wheel $g$ is upon the shaft $h$, that is revolved by suitable power. If the friction-wheel has a rim that passes outside of the friction-pinion $f$, as at 4, then the larger portion of the conical friction-pinion will be downwardly, so as to pass at one edge beneath the rim; but if the wheel $g$ has a beveled edge, as at 5, then the larger part of the friction-pinion will be upwardly, so as to be above, but to rest against, the bevel of the rim. In either case the surfaces of $f$ and $g$ that are in contact require to be kept together by the action of a spring, $o$, and I place the same in the socket to give end motion to the spindle. When the surfaces in contact are made as at 4, this spring presses the spindle upwardly; and to effect this object it is placed below the short cylindrical step 8, that is within the socket $a$ and receives the lower end of the spindle.

When the frictional surfaces are formed as at 5, the spring $o$ is applied so as to press the spindle downwardly, and it is placed around the lower end of the spindle, and acts expansively between a nut, 6, and the lower end of the bushing $c$. It is preferable to employ steel washers, and at each end of the spring, to prevent the parts wearing.

The tubular bushing is perforated with holes sufficiently numerous to allow oil to pass freely to the spindle, and it is preferable to make the spring spiral, as shown in Fig. 3.

There are any desired number of friction-wheels upon the shaft $h$, and they correspond in number with the spindles. The movable case $l$ is preferably of sheet-iron, hinged at the lower edge, and of a size and shape adapted to coming up in front of the range of friction-wheels; and it is preferable to provide notches for the range of friction-pinions, so as to inclose in the case the friction-wheels and to surround the pinions.

I claim as my invention—

1. In a spinning-machine, the spindle driven by frictional gearing, in combination with the containing-socket and a spring within the oil-space of said socket, substantially as set forth.

2. The tubular bushing $c$, surrounding the cylindrical portion of the spindle, in combination with spring $o$, socket $a$, and frictional gearing, substantially as set forth.

Signed by me this 20th day of December, A. D. 1877.

THOMAS WRIGLEY.

Witnesses:
GEO. F. PINCKNEY,
HAROLD SERRELL.